UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

BINDING AND COATING COMPOSITION.

1,189,549.     Specification of Letters Patent.     Patented July 4, 1916.

No Drawing.     Application filed March 29, 1910. Serial No. 552,178.

*To all whom it may concern:*

Be it known that I, CARLETON ELLIS, a citizen of the United States, residing at Montclair, in the county of Essex and State of New Jersey, have invented certain new and useful Improvements in Binding and Coating Compositions, of which the following is a specification.

This invention relates to a plastic or fluent material comprising resins extracted from crude rubber, and in particular, relates to the use of the liquid resin extracted from resinous rubber in the process of refining same, and the object of the invention is to make application of the aforesaid fluent resinous bodies for the purpose of softening, tempering, or mellowing various plastic or film forming products of commercial value.

Owing to the peculiar binding and tempering qualities of guayule resin, and similar rubber resins, a field for their use is found in the manufacture of paint. A slow drying "pitchy" paint suitable as an iron and steel preservative composition may be made from 80 parts of guayule resin, 40 parts of benzol, 20 parts of Japan drier and 100 parts of red oxid of iron pigment. Other pigments may also be used and the proportion of solvents in the composition varies to suit any particular application. Hitherto "pitchy" paints of satisfactory quality have not been made except of black or brown shades.

Another paint composition is made by boiling guayule resin with 0.5% to 1.0% of litharge, borate of manganese or similar drier and subsequently reducing with turpentine, benzol or other solvent. Colors may then be added.

Guayule resin is advantageously used as a basis for coating gasometers and similar metal structures exposed to liquids having components capable of acting on or destroying ordinary paint, and is therefore well fitted for coacting all metal work exposed to dampness or to the action of liquids containing various chemicals. The "pitchy" forms are most desirable.

Another paint is made from guayule resin 75 parts, linseed oil 10 parts, Japan drier 20 parts, turpentine 45 parts, and red oxid of iron 100 parts. Other drying oils may be used in place of linseed oil although in the case of Chinese wood oil, difficulties arise owing to the very dull surface produced because of the changes which take place in Chinese wood oil on drying.

An elastic paint may be made from linseed oil 4 parts, guayule resin 4 parts, copal resin 1 part and turpentine 3 parts. This may be colored if desired with white lead, zinc oxid, sublimed lead, lithopone and the like to make an enamel. Baking japans similarly may be made.

For cement structures as a cement paint, guayule resin is eminently adapted owing to the fact that it is seemingly unaffected by the alkalis of cement and forms an impervious coating which is inexpensive and readily applied. A mixture of 3 parts of Pontianak resin, 1 part of guayule resin, 4 parts of benzin, 2 parts of benzol, and sufficient pigment to color affords a very satisfactory composition. Portland cement may be added to this as a thickener.

Guayule resin may be stiffened if desired for use in paint compositions required to produce a very hard surface and this stiffening may be done by heating the resin with 3% to 5% of hydrated lime or zinc oxid.

A very satisfactory shingle stain may be made from 20 parts of guayule resin, 1 part of copper oleate, 15 parts of benzol, 5 parts of Japan drier and sufficient pigment to color. In place of copper oleate, the copper may be introduced by dissolving copper oxid in guayule resin at a temperature of 140° C. The guayule resin may be replaced in part by drying oil or mineral oil.

For the protection of structural steel embedded in concrete, a special composition is required, if it be desired, to use a protective paint which will not only bond with the structural steel but also with the concrete. For this purpose, 50 parts of guayule resin, 25 parts of Pontianak resin, 50 parts of Portland cement and 50 parts of benzol may be incorporated, the Pontianak resin being melted, the guayule resin added thereto, the thinner then being introduced and finally the cement well mixed in. The Pontianak resin may be replaced by ordinary rosin or hardened rosin if desired, as in the presence of guayule resin, rosin does not show the same sensitiveness toward moisture that it does ordinarily.

A steel protective dubbing may be made by dissolving 1 part of chromium resinate in 10 parts of guayule resin. This may be thinned if desired with benzol or other thinner. In place of the chromium resinate, a chromated guayule resin may be made by treating the resin with an aqueous solution of caustic soda containing 5% to 8% of caustic soda based on the weight of guayule resin used. This may then be precipitated with chrome alum.

A cement primer suitable for coating concrete prior to painting with ordinary paint may be made by incorporating 10 parts guayule resin, 20 parts of Pontianak resin, 5 parts of fatty acids from linseed oil and 15 parts of benzol.

Having described my invention to the details of which I do not wish to be limited, what I claim is:—

1. A fluent material, comprising a stiffening material, including a solid rubber resin and a softening agent including guayule resin as a stiffening agent all in the proportions substantially as described.

2. A fluent material, comprising a stiffening material, including Pontianak rubber resin and a softening agent, including guayule rubber resin as a stiffening agent all in the proportions substantially as described.

3. A fluent material comprising a solution of a saponifiable resinous body and an unsaponifiable rubber resin all in the proportions substantially as described.

4. A composition of matter for the protection of structural steel embedded in concrete comprising a solution of an unsaponifiable resinous body and a saponifiable body and Portland cement all in the proportions substantially as described.

5. A composition of matter for the protection of structural steel embedded in concrete, comprising a solution of a saponifiable rubber resin and an unsaponifiable rubber resin all in the proportions substantially as described.

6. A composition of matter for the protection of structural steel embedded in concrete, comprising a solution of Pontianak resin and guayule resin all in the proportions substantially as described.

In testimony whereof I have affixed my signature in presence of two witnesses.

CARLETON ELLIS.

Witnesses:
   ALFRED C. MEYER,
   FRANCES I. NEWMAN.